Nov. 13, 1962 W. A. KENNEDY 3,064,165
RELAY SPEED-UP CIRCUIT
Filed May 23, 1960 3 Sheets-Sheet 1

INVENTOR.
WILLIAM A. KENNEDY
BY Moody and Phillips
ATTORNEYS

INVENTOR.
WILLIAM A. KENNEDY
BY Moody and Phillips
ATTORNEYS

Nov. 13, 1962 W. A. KENNEDY 3,064,165
RELAY SPEED-UP CIRCUIT
Filed May 23, 1960 3 Sheets-Sheet 3

INVENTOR.
WILLIAM A. KENNEDY
BY Moody and Phillips
ATTORNEYS 3,064,165
RELAY SPEED-UP CIRCUIT
William A. Kennedy, Cedar Rapids, Iowa, assignor to Collins Radio Company, Cedar Rapids, Iowa, a corporation of Iowa
Filed May 23, 1960, Ser. No. 30,887
12 Claims. (Cl. 317—148.5)

This invention relates generally to control circuits for energizing and de-energizing relay means and, more specifically, to such a control circuit employing a single capacitor means to accelerate both energization and de-energization of the relay.

In the prior art there exist several structures for speeding up energization of a relay. One of these prior art structures comprises the parallel combination of a resistor and a capacitor placed in series with the relay winding and the energizing voltage. When a control switch is closed to supply the energizing voltage to the relay winding the capacitor will present comparatively small impedance to the initial flow of energizing current, thus permitting said initial current flow to be quite large. Consequently, the relay winding will be energized more quickly than if the capacitor were not present. Once the initial surge of current has passed, the capacitor will present a very large impedance to the steady D.C. voltage and the current flow through the relay winding will be determined by the resistor in parallel with the capacitor and in series with the relay winding. This prior art structure, however, provides no means for rapid de-energization of the relay.

Another prior art structure provides a capacitor connected in parallel with the relay winding with respect to the energizing voltage source and having an energizing switch located in the capacitor and relay winding loop so as to disconnect the power from the relay winding when open, while at the same time permitting the source voltage to charge the capacitor. When the switch is closed the charge on the capacitor discharges through the relay winding with a polarity as to aid the current from the energizing voltage source, thus increasing the speed of energization. During steady state operation the capacitor will become charged to a potential equal to the potential drop across the relay winding. For purposes of de-energizing the relay rapidly, there can be provided a second switching means which will function to reverse the terminal connections of the capacitor with the terminal connections of the relay winding so that the capacitor will discharge through the relay winding with an opposite polarity to the residual current to the relay winding. The reversing of the capacitor terminals must be done substantially simultaneously with the opening of the switching means (power switch) which supplies the energizing voltage source to the relay winding. If the power switching means is opened before the reversal of the capacitor terminals is completed, said power switching means will draw an arc and could conceivably cause a collapse of the magnetic field in the relay winding before the capacitor is connected thereacross; thus defeating the purpose of connecting the capacitor across the relay winding in reverse manner. If, on the other hand, the power switch is not opened until after the capacitor has been connected in reverse manner across the relay winding (and also across the energizing voltage source), then the capacitor can discharge through said voltage source, thus again defeating the purpose of the circuit. In order to have such a circuit operate efficiently it would appear necessary that the capacitor become connected in reverse manner across the relay winding at exactly the same point in time as the power switch begins to open, thus effectively transferring the coil current flow from a path including the power switch to the path including the capacitor. Such an arrangement is difficult to obtain mechanically due to synchronization problems and to the fact that switches cannot be opened in time intervals of less than several tens of milliseconds. Only with relatively expensive and precision mechanisms can the proper synchronization of the switching mechanism be obtained.

It is an object of the present invention to provide a circuit means whereby the speed of energization of a relay is increased, and also whereby the speed of de-energization of the relay is increased, with the use of but a single capacitor; said circuit means being capable of being switched from an energizing function to the de-energizing function with extreme rapidity and without the aid of electromagnetic or mechanical switches.

Another object of the invention is to provide a simple and reliable means for increasing the speed of energization and the speed of de-energization of a relay with means employing but a single capacitor.

A further aim of the invention is to provide a control means for increasing the speed of energization and de-energization of a relay means employing a capacitor which for purposes of de-energizing the relay, can be connected across the relay winding substantially simultaneously with the removal of power from the relay winding.

An additional purpose of the invention is a control circuit for connecting across said relay winding, simultaneously with the removal of power from a relay winding, a charged capacitor in such a manner that the polarity of the charged capacitor is opposed to the self-induced voltage in the relay winding.

Another object of the invention is to improve relay energization and de-energization circuits generally.

In accordance with the invention there is provided a voltage source, and connected in series across this voltage source there is a series circuit comprising a power supply switch, a parallel circuit, and the relay winding to be controlled. The parallel circuit is comprised of two legs, the first leg comprising a resistor and the second leg comprising a diode means poled to present a low impedance to said power supply, and a capacitor connected in series therewith. When the power supply switch is closed most of the initial surge of current passes through the power supply switch, the diode means, the capacitor means, and then through the relay winding back to the power supply. The diode is poled so as to supply a low impedance to this current surge. A high speed switching means such as a transistor, vacuum tube, or other suitable electron valve, has its electron emitting electrode connected between the diode means and the capacitor means, and its electron collector electrode connected to the junction between the voltage source and the relay winding so that a complete circuit is established from the capacitor through the electron valve and the relay winding when the electron valve is conductive. The control electrode is connected to a point between the power switch and the parallel circuit. Means are provided for biasing the control electrode with respect to said electron emitter electrode so that when said power supply switch is closed the control electrode of said electron valve will be biased below cutoff, but that when the power supply switch is opened the charge on said capacitor will function to bias said control electrode above cutoff so that said control electrode will become conductive, thus permitting the charge on the capacitor to discharge through the electron valve and through the relay winding in a polarity opposite the residual current in the relay winding.

In accordance with a specific feature of the invention it is to be noted that during energization of the relay winding the capacitor is in series with the relay winding with respect to the power supply, and that simultaneously with the removal of power from the relay winding the capacitor is connected across the winding with a polarity such that the discharge current from said capacitor will flow through the relay winding in opposition to the residual current in the relay winding.

The above-mentioned and other objects of the invention will be more clearly understood from the following detailed description thereof when read in conjunction with the drawings in which.

It is to be noted that throughout the following description of the various figures corresponding elements will be identified by the same reference characters, although primed in succeeding figures.

Figure 1:
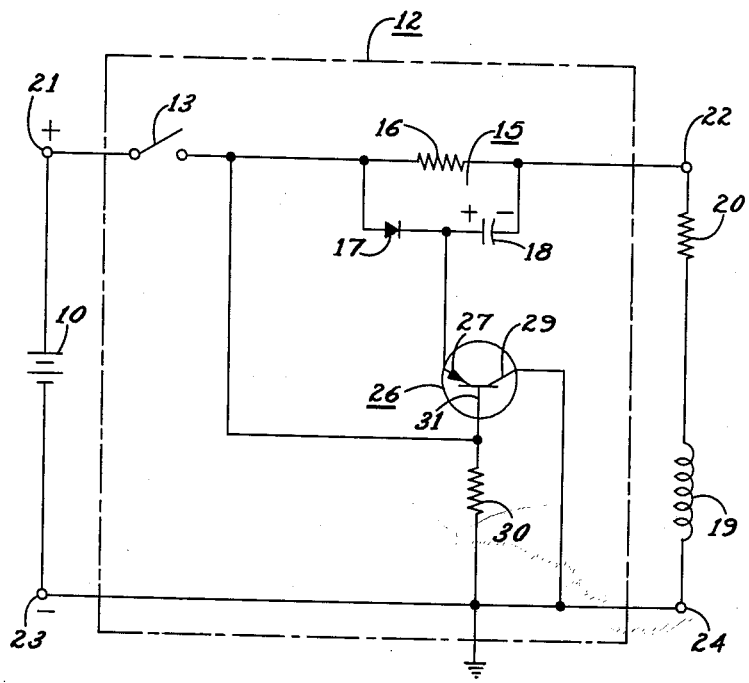
FIG. 1 is a schematic diagram of the invention employing a PNP type transistor.

Referring now specifically to FIG. 1 a D.C. battery source 10 supplies the energizing voltage to a relay winding 19 through a control circuit means 12. The control circuit means 12 comprises a series combination of a power supply switch 13, a parallel circuit 15 comprised of resistor 16, diode means 17, and capacitor 18. The said control circuit means 12 is connected between one terminal 21 of the battery source 10 and a first terminal 22 of the relay winding 19 (which includes internal relay winding resistance 20). The other terminal 23 of the battery source 10 is connected directly to the other terminal 24 of the relay winding 19, and to ground potential.

That portion of the circuit just described functions to provide a rapid energization of the relay winding 19. More specifically, when the power switch 13 is closed an initial current will surge from the battery 10 through the switch 13, diode 17, capacitor 18 (which is virtually a short circuit during this initial current flow), and through relay winding 19 (which includes coil resistance 20). As the charge across capacitor 18 begins to increase the current flow therethrough will decrease in an exponential manner until no current flows through the capacitor 18; all of the current being D.C. and flowing instead through the resistor 16, which condition represents the steady state operation of the circuit. Since the value of resistor 16 is considerably greater than the impedance of the capacitor 18 during the initial transient condition, it is readily apparent that the winding 19 will become energized more quickly by virtue of the presence of capacitor 16 than would be the case if all the initial energizing current had to flow through the resistor 16.

Now, in order to provide for a speedy release of the relay when the switch 13 is opened suddenly, the charge accumulated on capacitor 18 during steady state operation is discharged through the relay winding 19 in a direction as to oppose the residual current flow in the relay winding. Such a result is accomplished by the following structure. A PNP type transistor 26 has its emitter electrode 27 connected to the junction 28 between diode 17 and capacitor 18, its collector electrode 29 connected to the negative terminal 23 of battery supply source 10 and its base electrode 31 connected directly to the anode of diode 17, and through isolating resistor 30 to the negative terminal 23 of voltage source 10.

During the steady state operation of the relay, i.e., when switch 13 is closed, the potential of the base electrode 31 is the potential of the positive terminal of battery 10. Since the transistor 26 is of the PNP type, it (the transistor) will be in a non-conductive state. However, as soon as the power supply switch 13 is opened the potential of the base 31 will decrease towards ground potential. It is to be noted at this point that the R–C time constant of the base electrode (31) circuit is quite short so that the change of the potential of the base electrode to ground potential occurs substantially instantaneously. Since the emitter electrode 27 is now a good deal more positive than the base electrode 31, the transistor 26 becomes conductive and will permit discharge of the capacitor 18 therethrough. Specifically, the discharge path of the capacitor 18 is from capacitor 18 through emitter electrode 27 and collector electrode 29 of transistor 26, relay winding 19 (and internal resistance 20), and back to the capacitor 18. It is apparent from the circuit diagram of FIG. 1 that the current flow caused by the discharge of capacitor 18 is in opposition to the residual current flow in the relay winding 19 and thus will speed the collapse of the magnetic field in the relay winding 19.

Figure 2:
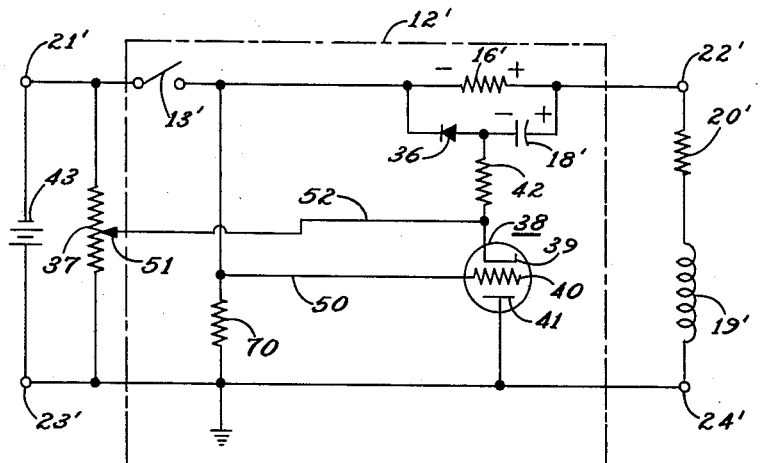
FIG. 2 is a schematic diagram of another form of the invention employing a vacuum tube.

Referring now to FIG. 2, there is shown a form of the invention employing an electron discharge tube 38 in lieu of the PNP type transistor shown in FIG. 1. Although the general principles of operation are quite similar to those discussed in connection with the circuit of FIG. 1, there are certain distinctions which will be described in detail as follows.

It will be noted that the polarity of the battery source 43, the diode 36, and the tube 38 are reversed from the polarity of the corresponding battery source 10, diode 17 and transistor 26 of FIG. 1. Such reversal of polarity is, of course, necessitated by the fact that the bias on the grid of the tube 38 is opposite in polarity to the bias required in the PNP transistor. Worded in another manner, the PNP type transistor is cut off when the base electrode is positive with respect to the emitter electrode whereas the tube 38 is cut off when the control grid 40 is biased negatively with respect to the cathode.

In the operation of the structure of FIG. 2 the capacitor 18' will become charged as indicated in FIG. 2 by current flow therethrough and through relay winding 19' and internal resistor 20' when switch 13' is closed. During the short interval of time immediately following the closure of switch 13' the capacitor 18' will function as a virtual short circuit across resistor 16', thus permitting relatively rapid energizing of the relay winding 19'. After the transient period has ended the capacitor 18' will present a high impedance to the D.C. voltage source 43 so that the amount of current flow through the winding 19' will be determined by the internal resistor 20' and the resistor 16'. During the aforementioned steady-state operation, the tube 38 will be non-conductive due to the fact that the control grid 40 thereof is connected to the negative terminal of voltage source 43 through lead 50 and the cathode 39 of tube 38 is connected to a point 51 on resistor 37 through lead 52, which lead is at a potential positive with respect to the potential of control grid 40.

When it is desired to de-energize the relay winding 19', switch 13' is opened, thus permitting the positive charge on the right hand plate of capacitor 18' (in the drawing) to increase the potential of control grid 40 through resistor 16' in a positive direction so that the tube 38 will become conductive. Further, the potential of the grid 40 is caused to increase in a positive direction through resistor 70 which has one of its terminals connected to the positive terminal of battery 43 (i.e., ground potential). The increase in potential of grid 40 occurs almost instantly due to the fact that almost no current is required to accomplish such increase in potential. The capacitor 18' can then discharge through the relay winding 19' and its internal resistor 20', through the conductive tube 38 and the resistor 42. This discharge current, it will be noted, opposes the residual current remaining in the relay 19' when the switch 13' is opened, thus hastening the de-energization of the relay winding 19'.

Figure 3:
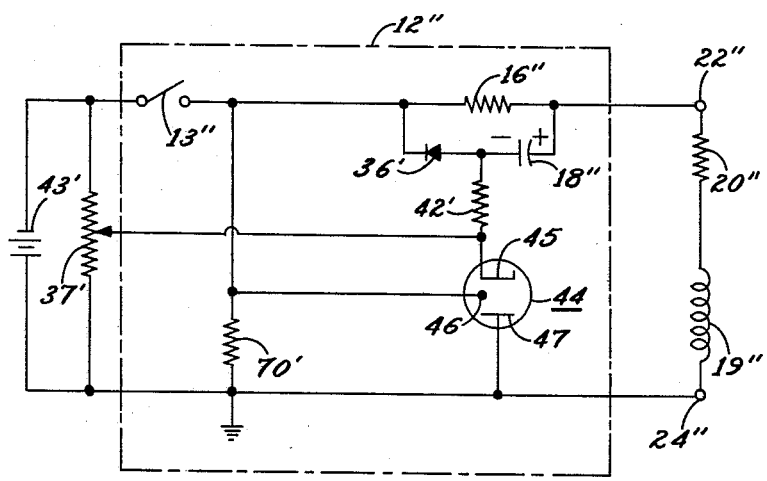
FIG. 3 is a schematic diagram of a third form of the invention employing a gaseous discharge tube.

Referring now to FIG. 3, a gas tube 44 is substituted for the vacuum tube 38 of FIG. 2. The gas tube is comprised of a cathode 45, an anode 47, and a starting element 46 which corresponds respectively to the cathode 39, anode 41 and the control electrode 40 of the tube 38 of FIG. 2. The principle of operation is almost identical to that of the structure of FIG. 2. The capacitor 18″ initially presents a virtual short circuit to the initial energizing current when the switch 13″ is closed. The gas tube 44 is non-conductive during the initial energization period and also during steady state energization of the relay winding 19″ due to the fact that the firing electrode 46 is biased negatively with respect to the cathode 45. Upon opening of switch 13″ the potential of the firing electrode 46 is caused to become more positive than the cathode 45, thus causing energizing of gas tube 44 and providing a path for the discharge of capacitor 18″, which discharge current opposes the residual current remaining in the relay winding 19″.

Figure 4:
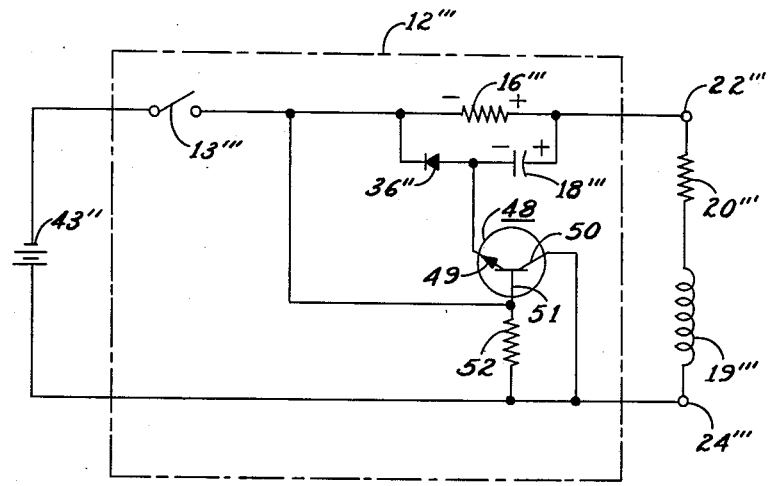
FIG. 4 is a schematic diagram of a fourth form of the invention employing an NPN type transistor.

Referring now to FIG. 4, the gas tube of FIG. 3 is replaced by an NPN type transistor 48 which is comprised of an emitter electrode 49, a base electrode 51 and a collector electrode 50 which correspond generally to the cathode 45, the firing electrode 46 and the anode 47 of the gas tube 44 of FIG. 3.

In operation the capacitor 18‴ will provide a virtual short circuit around resistor 16‴ of the initial surge of current through the relay winding 19‴ when the switch 13‴ is closed initially. The capacitor 18‴ will then become charged as shown in FIG. 4. Consequently, during steady-state operation the transistor 48 will be non-conductive since the potential of the base electrode 51 is not positive with respect to the emitter electrode 49. However, as soon as switch 13‴ is opened the potential of the base 51 will become positive very quickly due to the fact that the said base is connected to the positive terminal of battery source 43″ through resistor 52 and further because said base electrode 51 is connected directly to the positively charged plate of capacitor 18‴ through resistor 16‴. The transistor 48 now being conductive, completes a path for the discharge of capacitor 18‴ through relay winding 19‴ and its internal resistance, and resistor 52.

It is to be noted that whereas the emitter electrodes and the base electrodes of the transistors of FIGS 1 and 4 are both connected directly to the same terminal of the power supply (the emitter electrode through a diode) the corresponding cathode and control electrodes of the structures of FIGS. 2 and 3 are not. Rather the cathode structures of the tubes of FIGS. 2 and 3 are connected to a voltage divider which in turn is connected across the power supply. Such an arrangement is desirable in order to make the cathodes more positive than the control electrodes (which in the case of FIG. 2 is control grid 40 and in the case of FIG. 3 is firing electrode 46). The resistors 42 and 42′ of FIGS. 2 and 3 permit this biasing potential to exist across said cathodes and control grids. Such a biasing potential is required since it is necessary in most vacuum tubes and gas tubes to have the potential of the control electrode more negative than the cathode electrode in order to produce or maintain a condition of non-conductivity, which it not the case with transistors.

Figure 5:
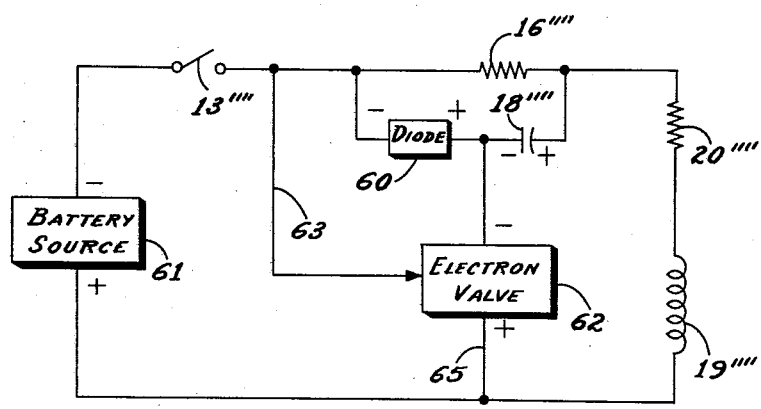
FIG. 5 is a combination schematic and block diagram of a generalized form of the invention.

Referring now to FIG. 5, there is shown a generic sketch of the invention. The polarity of the battery source 61, the diode 60, the capacitor 18⁗, and the electron valve 62 are indicated. It is to be realized that if certain types of electron valves are employed all of the polarities shown will be reversed.

In FIG. 5 the lead 63 functions to connect a terminal of the battery source to the control electrode (not shown) of the electron valve 62. The leads 64 and 65 are connected to the electron emitting and electric collecting electrodes of the electron valve, although not necessarily in the order just enumerated. The operation of the structure is similar to that described with respect to FIGS. 1 through 4.

It is to be noted that the forms of the invention herein shown and described are but preferred embodiments thereof and that various changes may be made in circuit arrangements and in components employed without departing from the spirit or scope of the invention.

I claim:
1. Circuit means for energizing and de-energizing an inductor comprising the series arrangement of voltage source means, switching means, and parallel circuit means connected across said inductor, said parallel circuit means comprising a resistor connected in parallel with the series combination of diode means and capacitor means, said diode means poled to present its low forward impedance to said voltage source, an electron valve comprising first and second electrodes consisting of electron emitter electrode means and electron collector electrode means, and control electrode means, first circuit means connecting said first electrode to a first junction lying between said diode means and said capacitor means and second circuit means connecting said second electrode to a second junction lying between said voltage source and said inductor, said electron valve constructed to provide, when conductive, a discharge path for charge produced on said capacitor means by said voltage source when said switch means is closed, and means connecting said control electrode means to a third junction between said switching means and said parallel circuit means.

2. Circuit means in accordance with claim 1 in which said electron valve comprises a PNP type transistor with the electron emitter electrode means connected to said first junction and the electron collector electrode means connected to said second junction, in which said control electrode means consists of a base electrode of said transistor, and in which said diode means is poled so that its high back impedance is presented to said first junction.

3. A circuit means in accordance with claim 1 in which said electron valve comprises a vacuum tube, in which said first circuit means comprises an impedance means connecting said electron emitter electrode means to said first junction, in which said electron collector electrode means is connected to said second junction, and means for biasing said electron emitter electrode means positive with respect to said control electrode means when said switching means is closed.

4. Circuit means in accordance with claim 1 in which said electron valve consists of a gas tube in which said first circuit means comprises an impedance means connecting said electron emitter electrode means to said first junction, in which said electron collector electrode means is connected to said second junction, and means for biasing said electron emitting electrode means positively with respect to said control electrode means when said switching means is closed.

5. Circuit means in accordance with claim 1 in which said electron valve comprises an NPN type transistor, in which said first circuit means connects the electron emitter electrode means of said electron valve to said first junction, and in which said second circuit means connects the electron collector electrode means to said second junction.

6. Circuit means for energizing and de-energizing an inductor comprising the series arrangement of a D.C. voltage source, a switching means having an open position and a closed position and a resistor means connected across said inductor, D.C. voltage storage means comprising an asymmetrical means and a capacitor connected in series arrangement across said resistive means and having a first junction therebetween, an electron valve comprising a control electrode and connected between said first junction and a second junction between said voltage source and said inductor to provide, when conductive, a discharge path for the charge accumulated across said capacitor means from said D.C. voltage source when said switching means is in its closed position, and means responsive to the opening of said switching means for supplying a voltage to said control electrode to cause said electron valve to become conductive.

7. Electrical means for rapidly energizing and rapidly de-energizing an inductor comprising the series arrangement of a D.C. voltage source, switching means and circuit means connected across said inductor, said circuit means comprising resistor means, a capacitor means in parallel arrangement with said resistor means with respect to said voltage source and asymmetrical means connected between said switching means and said capacitor means with respect to said voltage source and being poled to present its low forward impedance to said D.C. voltage source, an electron valve comprising first and second electrodes consisting of electron emitting electrode means and electron collecting electrode means, and control electrode means, first circuit means connecting a first junction lying between said asymmetrical device and said capacitor means to said first electrode, second circuit means connecting a second junction lying between said voltage source and said inductor to said second electrode, said electron valve constructed to provide, when conductive, a discharge path through said inductor for the charge developed across said capacitor means by said voltage source means after said switching means is opened, and means connecting said control electrode to a point between said asymmetrical device and said switching means.

8. Circuit means in accordance with claim 7 in which said electron valve comprises a PNP type transistor with the electron emitter electrode means connected to said first junction and the electron collector electrode means connected to said second junction, in which said control electrode means consists of a base electrode of said transistor, and in which said diode means is poled so that its high back impedance is presented to said first junction.

9. A circuit means in accordance with claim 7 in which said electron valve comprises a vacuum tube, in which said first circuit means comprises an impedance means connecting said electron emitter electrode means to said first junction, in which said electron collector electrode means is connected to said second junction, and means for biasing said electron emitter electrode means positive with respect to said control electrode means when said switching means is closed.

10. Circuit means in accordance with claim 7 in which said electron valve consists of a gas tube in which said first circuit means comprises an impedance means connecting said electron emitter electrode means to said first junction, in which said electron collector electrode means is connected to said second junction, and means for biasing said electron emitting electrode means positively with respect to said control electrode means when said switching means is closed.

11. Circuit means in accordance with claim 7 in which said electron valve comprises an NPN type transistor, in which said first circuit means connects the electron emitter electrode means of said electron valve to said first junction, and in which siad second circuit means connects the electron collector electrode means to said second junction.

12. Circuit means for rapidly energizing and rapidly deenergizing an inductor, a delta type circuit comprising a first resistive leg, a second leg comprising an asymmetrical device and a third leg comprising a capacitor means, a series circuit arrangement comprising a voltage source, switching means, and said resistor connected across said inductor, an electron valve comprising electron emitting means, electron collecting means and control electrode means, a first junction lying between said asymmetrical device and said capacitor means and a second junction lying between said voltage source and said inductor, said first and second junctions being connected across said electron emitting means and said electron collecting means, and means for connecting said control electrode to a third junction between said switching means and said delta circuit.

References Cited in the file of this patent
UNITED STATES PATENTS

| | | |
|---|---|---|
| 2,279,849 | Warrington | Apr. 14, 1942 |
| 2,906,927 | Schrack | Sept. 29, 1959 |
| 2,907,929 | Lawson | Oct. 6, 1959 |